Figure 1:
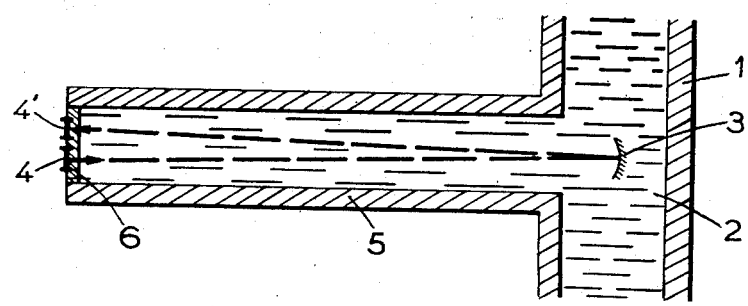

Sept. 18, 1956  M. F. B. PICARD ET AL  2,763,181

PROJECTING INDICATING AND RECORDING APPARATUS

Filed Oct. 15, 1953

United States Patent Office 2,763,181
Patented Sept. 18, 1956

2,763,181

PROJECTING INDICATING AND RECORDING APPARATUS

Maxime Felix Benoit Picard and Jacques Georges Henri Cosson, Paris, France, assignors to Societe de Prospection Electrique Procedes Schlumberger, Paris, France, a corporation of France Application October 15, 1953, Serial No. 386,284

Claims priority, application France November 14, 1952

7 Claims. (Cl. 88—24)

The present invention relates to indicating or recording instruments, such as galvanometers, for example, including a movable element responsive to the magnitudes to be observed or recorded, the said element carrying a mirror immersed in a liquid and which reflects an image of a fixed element towards the place where the observation or record is to be made.

While the invention is susceptible of general use in indicating and recording apparatus, it is of particular utility in apparatus in which the image formed by the mirror is not of a sole reference mark but is of a graduated scale, the displacement of the "scale image" being observed or recorded. The production of an instrument of this character presents difficulties because aberrations inherent in the optical systems utilized up to the present time render the latter generally incapable of giving the extremely sharp and definite image of the object that is required.

It is an object of the invention, accordingly, to provide new and improved indicating and recording apparatus that is free from the above-noted disadvantage of the prior art.

Another object of the invention is to provide new and improved indicating and recording apparatus of the above character utilizing relatively simple means for providing an image having an extremely high degree of sharpness so that in the particular case of a moving scale galvanometer of the type mentioned above, for example, the greatly enlarged image of the scale which is received on the transluscent glass of the observation screen possesses a truly remarkable sharpness.

These and other objects of the invention are attained by causing a luminous pencil, preferably of very intense white light and traversing a path from the object to the image obtained by reflection on the mirror, over the greater part of its travel, to pass through one or several means having practically the same index of refraction as that of the medium in which the mirror is immersed. Preferably, the object will be disposed and the image will be obtained on surfaces of separation between the means having a given index of refraction and free air. Under these conditions, it can be readily seen that the image obtained does not undergo any chromatic aberration and the only other aberrations which it could undergo could only be due to reflection from the mirror.

Moreover, it is possible, in the well known manner, to suppress practically all spherical aberration due to the mirror by utilizing a spherical concave mirror and by disposing the object in the immediate neighborhood of the center of the sphere of the mirror, the image then being likewise in the neighborhood of the center.

In practice, the advantages of the invention may be obtained by disposing before the mirror an elongated element filled with the same liquid as that in which the mirror is immersed. Preferably, the elongated element is closed at the place where it is desired to obtain the image by a plate of solid transparent material preferably having an index of refraction in the neighborhood of that of the liquid.

Alternatively, a block of solid transparent matter having substantially the same index of refraction as that of the liquid in which the mirror is immersed may be placed opposite the mirror and at a short distance therefrom. The object may be disposed on or in the neighborhood of the exterior surface of the block, the image being also formed on or in the neighborhood of the exterior surface of the block, in that case, after one or several refractions. According to the invention, moreover, the block of solid transparent material may comprise a spherical concave surface in which is snugly fitted a spherical convex surface of the same radius carried by another block, the said spherical surface being centered on the top of the mirror in such fashion that the orientation of the block can be varied and as a consequence the positions of the object and of the image can be controlled.

Figure 2:
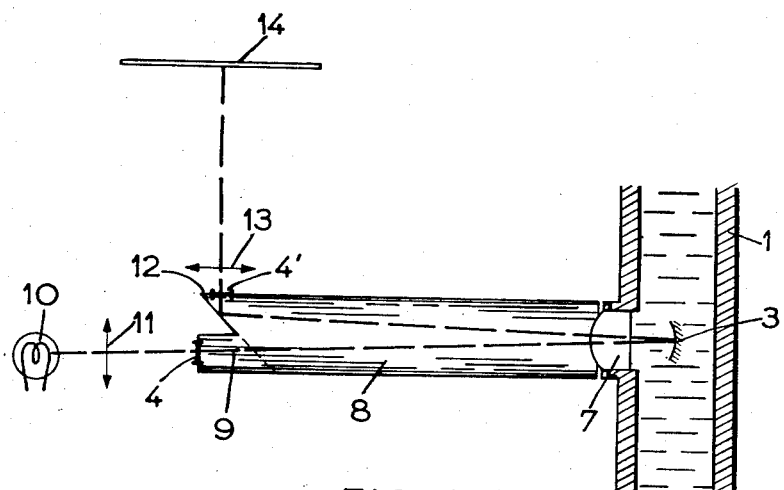

Other objects and characteristics of the invention will appear during the course of the following description taken in conjunction with the attached drawings of a representative embodiment, in which:

Fig. 1 is a schematic diagram illustrating the principle on which the invention is based; and Fig. 2 is a view in longitudinal section through an immersed, movable scale galvanometer constructed according to the invention.

In Fig. 1, 1 designates the body of a measuring apparatus such as a galvanometer, for example, filled with a liquid 2, in which is immersed a mirror 3 carried by the movable element (not shown) of the galvanometer, which may be of the type described in U. S. Patents Nos. 2,623,083 and 2,623,084.

The problem is to obtain the image reflected by the mirror 3 of an object 4 disposed at a conveniently chosen distance from the mirror. To this end, the body of the apparatus 1 is formed, according to the invention, with an extension 5 which extends up to the location of the object 4, the latter being, for example, a graduation engraved on a glass plate 6 carried by the extremity of the extension 5. The latter is filled with the same liquid as the apparatus or with a liquid having substantially the same index of refraction. In a known manner, the mirror 3 is formed with a concave spherical curvature and is disposed in such fashion that the point 4 lies, at rest, substantially at its center so that the image 4' thereof furnished by the mirror 3 substantially coincides at rest with the object 4 and deviates from the latter, as when the mirror 3 pivots to bring the image to the position 4', for example, while remaining on the glass plate which supports the object 4.

By virtue of the fact that the luminous pencil striking the mirror 3 and reflected by the latter remains in a medium of constant index of refraction, there is no chromatic aberration. Moreover, since the object and the image are both in the neighborhood of the optical center of the mirror 3, the image furnished presents a minimum of spherical aberration and is characterized by distinctness to an extremely marked degree.

Fig. 2 illustrates an adaptation of the principle as applied to an observation apparatus. In this case, the liquid filling the extension 5 is replaced by a transparent solid substance having substantially the same index of refraction as the liquid in which the mirror 3 is immersed. The apparatus 1 is formed with an opening located in front of the mirror 3 to permit the passage of luminous rays. This opening is closed by a kind of thick planeconvex lens 7 of the same index of refraction as the liquid 2, a requirement which is easy to meet, provided that the liquid is generally perchlorethylene, the index of refraction of which is very close to that of ordinary glass. The forward convex surface of the lens 7 is a spherical surface centered on the top of the mirror 3.

With the lens 7 cooperates a transparent bar 8 of generally rectangular section, one of the extremities of which is limited by a concave surface of the same curvature as the forward surface of the lens 7, the two surfaces being snugly fitted together with the interposition of a substance such as glycerine so as to prevent any air from remaining between the two surfaces.

The extremity of the bar 8 opposite the concave surface thereof is divided into two zones. One of these is the zone 9 on which is traced the scale 4, the distance from this scale to the mirror 3 being equal to the radius of curvature of the mirror. This scale is strongly and uniformly lighted by a luminous source 10 cooperating with a condensing lens 11, all in a manner well known. The second zone of the extremity of the bar 7 is cut away at an angle of, say 45° as indicated at 12 in such manner that the reflected rays coming from 3 experience a total refraction which causes the image 4' of the scale 4 to be formed on the lateral plane face 12 of the bar 7. The purpose of this structure is to separate optically the object 4 from the image 4'. In front of the image 4' is disposed, in the conventional manner, an objective lens of a microscope 13 which projects an image of the image 4' on a frosted glass screen 14 with a predetermined linear enlargement which may be of the order of 20 or 30, for example.

As in the preceding case, it will be readily apparent that the image 4' of the scale 4, in spite of the fineness of the latter, is absolutely distinct, since the luminous pencil continuously is reflected by the mirror 3 without traversing media of different indices of refraction. When the mirror 3 pivots, the image of the scale is displaced along the lateral face 12 of the bar 8 and the image of this image 4' on the screen 14 moves on this screen in a manner in itself well known.

The disposition of the lens 7 and of the bar 8 permits the position of the bar with respect to the mirror 3 to be varied or, what is simpler, the position of the apparatus 1 and consequently of the mirror, with respect to the bar 8, permitting of the zero position of the final image of the scale on the screen 14 for a given position of the mirror 3 to be regulated.

Numerous modifications can be made in the apparatus described without departing from the scope of the present invention.

In particular, while the latter has been described as applied to observation instruments, it can, of course, be applied to recording instruments; it is sufficient, for example, to record the image obtained on the screen 14 by a motion picture camera or the like. Moreover, in the foregoing description, the image and the object are taken as formed directly on the surfaces of separation between the air and the medium whose index of refraction corresponds to that of the liquid in which the mirror 3 is disposed. This is the most favorable disposition. It is possible, nevertheless, for the object to be disposed and for the corresponding image to be formed merely in the neighborhood of these surfaces. The invention, therefore, is not to be limited to the specific embodiment disclosed but should be considered as broadly as the scope of the following claims will allow.

We claim:

1. In apparatus for providing a representation of a variable quantity, the combination of a housing having a viewing window formed therein and containing a liquid, curved reflector means disposed in said liquid so as to be viewable through said window and having a point of focus located a given distance therefrom, means mounting said reflector means for movement in response to variations in the magnitude of said variable quantity, means cooperating with said viewing window and with the liquid between the latter and said reflector means to form an elongated optical path extending outwardly from said reflector means through said viewing window and substantially to said point of focus, said path comprising material having substantially the same index of refraction as said liquid, means directing a pencil of light through said path to said reflector means, and object means disposed substantially at the outer end of said path so as to intercept said pencil of light prior to impingement of the latter upon said reflector means, whereby an image of said object means will be formed in the vicinity of an interface between said path forming means and free air.

2. In apparatus for providing a representation of a variable quantity, the combination of a housing having a hollow tubular member extending laterally therefrom and closed by a light transmitting closure, said housing containing liquid filling said tubular member, curved reflector means disposed in said liquid so as to be viewable through said light transmitting closure and having a point of focus located substantially at the outer end of said tubular member, means mounting said reflector means for movement in response to variations in the magnitude of said variable quantity, means directing a pencil of light through said light transmitting closure to said reflector means, and fixed object means disposed substantially at the outer end of said tubular member for illumination by said pencil of light prior to impingement of the latter upon said reflector means, whereby an image of said object means will be formed in the vicinity of an interface between an outer surface portion of said tubular member and free air.

3. In apparatus for providing a representation of a variable quantity, the combination of a housing having a viewing window formed therein and containing a liquid, curved reflector means disposed in said liquid so as to be viewable through said window and having a point of focus located a given distance therefrom, means mounting said reflector means for movement in response to variations in the magnitude of said variable quantity, a solid transparent tubular member extending laterally from said housing substantially to said point of focus and having one end facing said viewing window, said tubular member having substantially the same index of refraction as said liquid, fixed object means disposed substantially at the outer end of said member in the vicinity of the interface between an outer surface thereof and free air, and means directing a pencil of light over said object means through said tubular member to said reflector means, whereby an image of said object means will be formed in the vicinity of an interface between an outer surface portion of said tubular member and free air.

4. In apparatus for providing a representation of a variable quantity, the combination of a housing having a viewing window formed therein and containing a liquid, concave reflector means of spherical curvature disposed in said liquid so as to be viewable through said window and mounted for movement in response to variations in the magnitude of said variable quantity, means cooperating with said viewing window and with the liquid between the latter and said reflector means to form an elongated optical path extending outwardly from said reflector means and through said viewing window a distance substantially equal to the radius of curvature of said reflector means, said path having substantially the same index of refraction as said liquid, means directing a pencil of light through said path to said reflector means, and object means disposed substantially at the outer end of said path for illumination by said pencil prior to impingement of the latter upon said reflector means, whereby an image of said object means will be formed in the vicinity of an interface between said path forming means and free air.

5. In apparatus for providing a representation of a variable quantity, the combination of a housing having a hollow tubular member extending laterally therefrom and closed by a light transmitting closure, said housing containing liquid filling said tubular member, concave reflector means of spherical curvature disposed in said liquid so as to be viewable through said light transmitting closure and spaced from the outer end of said tubular member a distance substantially equal to the radius of curvature of said reflector means, means mounting said reflector means for movement in response to variations in the magnitude of said variable quantity, means directing a pencil of light through said light transmitting closure to said reflector means, and fixed object means disposed substantially at the outer end of said tubular member for illumination by said pencil of light prior to impingement of the latter upon said reflector means, whereby an image of said object means will be formed in the vicinity of an interface between an outer surface portion of said tubular member and free air.

6. In apparatus for providing a representation of a variable quantity, the combination of a housing having a viewing window formed therein and containing a liquid, concave reflector means of spherical curvature disposed in said liquid so as to be viewable through said window and mounted for movement in response to variations in the magnitude of said variable quantity, a solid plano-convex lens mounted in said window, a solid transparent tubular member extending laterally from said housing and having a concave cavity formed in one end thereof adapted to fit snugly over the convex portion of said lens, said tubular member having substantially the same index of refraction as said liquid, transparent means interposed between said cavity and the convex portion of said lens for excluding air from therebetween, fixed object means disposed in the vicinity of the interface between a first outer surface of said tubular member and free air, substantially at the center of curvature of said reflector means, means directing a pencil of light over said object means through said tubular member and lens to said reflector means, a reflecting surface in the path of light reflected by said reflector and disposed at an angle to said first outer surface of said tubular member, and whereby an image of said object means will be formed at an observation location in the vicinity of the interface between another outer surface of said tubular member and free air.

7. Apparatus as defined in claim 6 in which said fixed object means is a scale.

References Cited in the file of this patent
UNITED STATES PATENTS

| | | |
|---|---|---|
| 1,216,272 | Berry | Feb. 20, 1917 |
| 1,899,804 | Hopfield | Feb. 28, 1933 |
| 1,977,027 | Vaughan | Oct. 16, 1934 |
| 2,150,398 | Paulson | Mar. 14, 1939 |
| 2,172,166 | Lange | Sept. 5, 1939 |
| 2,305,775 | Hansen | Dec. 22, 1942 |
| 2,366,194 | Kaiser | Jan. 2, 1945 |
| 2,471,800 | Von Mulinen | May 31, 1949 |
| 2,592,329 | Picard et al. | Apr. 8, 1952 |